US008995445B2

(12) United States Patent  
Le Maut et al.

(10) Patent No.: US 8,995,445 B2  
(45) Date of Patent: Mar. 31, 2015

(54) SYSTEM AND METHOD FOR RE-SEQUENCING DATA PACKETS ON A PER-FLOW BASIS

(75) Inventors: Francois Le Maut, Nice (FR); Rene Glaise, Nice (FR); Michel Poret, Gattieres (FR); Rene Gallezot, La Colle sur Loop (FR)

(73) Assignee: International Business Machines Corporation, Armonk, NY (US)

( * ) Notice: Subject to any disclaimer, the term of this patent is extended or adjusted under 35 U.S.C. 154(b) by 2792 days.

(21) Appl. No.: 10/722,900

(22) Filed: Nov. 26, 2003

(65) Prior Publication Data

US 2004/0143593 A1 Jul. 22, 2004

(30) Foreign Application Priority Data

Dec. 19, 2002 (EP) .................................. 02368137

(51) Int. Cl.
| | |
|---|---|
| H04L 12/28 | (2006.01) |
| H04L 12/939 | (2013.01) |
| H04L 12/933 | (2013.01) |
| H04L 12/931 | (2013.01) |
| H04L 12/70 | (2013.01) |

(52) U.S. Cl.  
CPC ............... *H04L 49/552* (2013.01); *H04L 49/15* (2013.01); *H04L 49/205* (2013.01); *H04L 2012/565* (2013.01)  
USPC .......................................... 370/394; 370/412

(58) Field of Classification Search  
CPC . H04L 2012/565; H04L 49/15; H04L 49/205; H04L 49/552  
See application file for complete search history.

(56) References Cited

U.S. PATENT DOCUMENTS

| | | | | |
|---|---|---|---|---|
| 5,231,631 A | * | 7/1993 | Buhrke et al. | 370/230 |
| 5,355,372 A | * | 10/1994 | Sengupta et al. | 370/367 |
| 5,894,477 A | * | 4/1999 | Brueckheimer et al. | 370/353 |
| 6,195,703 B1 | * | 2/2001 | Blumenau et al. | 709/238 |
| 6,678,271 B1 | * | 1/2004 | Flinsbaugh | 370/392 |
| 6,747,971 B1 | * | 6/2004 | Hughes et al. | 370/387 |
| 6,816,489 B1 | * | 11/2004 | Patra et al. | 370/390 |
| 2002/0083195 A1 | * | 6/2002 | Beshai et al. | 709/238 |
| 2002/0150097 A1 | * | 10/2002 | Yen et al. | 370/390 |
| 2003/0012200 A1 | * | 1/2003 | Salamat | 370/394 |
| 2003/0126233 A1 | * | 7/2003 | Bryers et al. | 709/219 |
| 2003/0200315 A1 | * | 10/2003 | Goldenberg et al. | 709/225 |
| 2003/0214949 A1 | * | 11/2003 | Shaikli | 370/394 |
| 2008/0253379 A1 | * | 10/2008 | Sasagawa | 370/395.5 |

* cited by examiner

*Primary Examiner* — Marsha D Banks Harold  
*Assistant Examiner* — Hooman Houshmand  
(74) *Attorney, Agent, or Firm* — Joscelyn Cockburn

(57) ABSTRACT

In a network device packets are marked with sequence identifiers at ingress of the device, switched through a plurality of switching planes and re-sequenced on a per flow basis at egress of the device. The re-sequencing system includes a controller that allocates to each received data packet a temporary storage location in a packet buffer. A plurality of output registers are provided, with each one associated with a flow. A pointer uses predefined parameters to point to an output register that has been previously assigned to receive data packets from the corresponding flow. Parameters in the pointed output register are correlated with parameters in a received packet to determine if the received packet is next in sequence to packets processed through a particular queue.

12 Claims, 8 Drawing Sheets

SYSTEM AND METHOD FOR RE-SEQUENCING DATA PACKETS ON A PER-FLOW BASIS

FIELD OF THE INVENTION

The present invention relates to high speed switching of data packets in general and more particularly to a system and method to restore the sequence of data packets switched through independent planes of a Parallel Packet Switch architecture.

BACKGROUND OF THE INVENTION

DWDM, which stands for Dense Wavelength Division Multiplexing, by merging onto a single optical fiber many wavelengths, is making available long-haul fiber-optic data communications links of huge aggregate capacity. Each wavelength is an independent communications channel which typically operates at OC48c i.e.: 2.5 Giga or $10^9$ bits per Second (Gbps), OC192c (10 Gbps) and in some systems at OC768c (40 Gbps). These rates are part of a family of rates and formats available for use in optical interfaces, generally referred to as SONET, which is a standard defined by the American National Standards Institute (ANSI) of which there exists an European counterpart, mostly compatible, known as SDH (Synchronous Digital Hierarchy). Thus, at each node of a network, the data packets or cells carried on each DWDM channel must be switched, or routed, by packet-switches that process and then switch packets between different channels so as to forward them towards their final destination. Ideally, it would be desirable to keep the processing of packets in the optical domain, without conversion to electronic form, this is still not really feasible today mainly because all packet-switches need buffering that is not yet available in an optical form. So packet-switches will continue to use electronic switching technology and buffer memories for some time to come.

Because of the data rates as quoted above for individual DWDM channels (up to 40 Gbps) and the possibility of merging tenths, if not hundredths, of such channels onto a single fiber the throughput to handle at each network node can become enormous i.e., in a multi-Tera or $10^{12}$ bits per second range (Tbps) making buffering and switching, in the electronic domain, an extremely challenging task. Constant significant progress has been sustained, for decades, in the integration of more logic gates and memory bits on a single ASIC (Application Specific Integrated Circuit), allowing implementation of complex functions required to handle the data packets flowing into a node according to QoS (Quality of Service) rules. Unfortunately, the progress in speed and performance of the logic devices over time is comparatively slow, and now gated by the power one can afford to dissipate in a module to achieve it. The time to perform a random access into an affordable memory e.g., an imbedded RAM (Random Access Memory) in a standard CMOS (Complementary MOS) ASIC, is, decreasing only slowly with time while switch ports need to interface channels having their speed quadrupling at each new generation i.e., from OC48c to OC192c and to OC768c respectively from 2.5 to 10 and 40 Gbps. For example, if a memory is 512-bit wide allowing to store or fetch, in a single write or read operation, a typical fixed-size 64-byte (8-bit byte) packet of the kind handled by a packet-switch, this must be achieved in less than 10 Nano or $10^{-9}$ second (Ns) for a 40 Gbps channel and in practice in a few Ns only in order to take care of the necessary speed overhead needed to sustain the specified nominal channel performance while at least one store and one fetch i.e., two operations, are always necessary per packet movement. This represents, nowadays, the upper limit at which memories and CMOS technology can be cycled making the design of multi-Tbps-class switch extremely difficult with a cost-performance state-of-the-art technology such as CMOS, since it can only be operated at a speed comparable to the data rate of the channel they have to process.

To overcome the above mentioned technology limitation, a parallel packet switch (PPS) architecture is used. It is comprised of multiple identical lower-speed packet-switches e.g., (100) operating independently and in parallel, as sketched in FIG. 1. In each ingress port-adapter, such as (110), an incoming flow of packets (120) is spread (130), packet-by-packet, by a load balancer across the slower packet-switches, then recombined by a multiplexor (140) in the egress part of each port-adapter e.g., (150). As seen by an arriving packet, a PPS is a single-stage packet-switch that needs to have only a fraction of the performance necessary to sustain a PPS port data rate (125). If four planes are used, as shown on FIG. 1 (planes A,B,C,D), they need only to have one fourth of the performance that would otherwise be required to handle a full port data rate. More specifically, four independent switches, designed with OC192c ports, can be associated to offer OC768c port speed, provided that ingress and egress port-adapters (110, 150) are able to load balance and recombine the packets. This approach is well known in the art and sometimes referred to as 'Inverse Multiplexing' or 'load balancing'. Among many publications on the subject one may e.g., refer to a paper published in Proc. ICC'92, 311.1.1-311.1.5, 1992, by T. ARAMAKI et al., untitled '*Parallel "ATOM" Switch Architecture for High-Speed ATM Networks*' which discusses the kind of architecture considered here.

The above scheme is also attractive because of its inherent capability to support redundancy. By placing more planes than what is strictly necessary it is possible to hot replace a defective plane without having to stop traffic. When a plane is detected as being or becoming defective ingress adapter load balancers can be instructed to skip the defective plane. When all the traffic from the defective plane has been drained out it can be removed and replaced by a new one and load balancers set back to their previous mode of operation.

Thus, if PPS is really attractive to support multi-Gbps channel speeds and more particularly OC768c switch ports it remains that this approach introduces the problem of packet re-sequencing in the egress adapter. Packets from an input port (110) may possibly arrive out of sequence in a target egress adapter (150) because the various switching paths, comprised of four planes (100, 102, 104 and 106) in the example of FIG. 1, do not have the same transfer delay since they run independently and can have different buffering delays. A discussion and proposed solutions to this problem can be found, for example, in a paper by Y. C. JUNG et al., 'Analysis of out-of-sequence problem and preventive schemes in parallel switch architecture for high-speed ATM network', published in IEEE Proc.-Commun., Vol. 141, No. 1, February 1994. However, this paper does not consider the practical case where the switching planes have, also, to handle packets on a priority basis so as to support a Class of Service (CoS) mode of operation, a mandatory feature in all recent switches which are assumed to be capable of handling simultaneously all sorts of traffic at nodes of a single ubiquitous network handling carrier-class voice traffic as well as video distribution or just straight data file transfer. Hence, packets are processed differently by the switching planes depending on the priority tags they carry. This does no longer comply with the simple FCFS (First-Come-First-Served) rule assumed by the above referenced paper and forces egress adapters to readout packets as soon as they are ready to be delivered by the switching planes after which they can be re-sequenced on a per priority basis. Also, the above paper implicitly assumes the use of a true time stamp (TS) which means in practice that all port-adapters are synchronized so as packets from different sources are stamped from a common time reference which is a difficult and expensive requirement to meet.

Another difficulty with a PPS architecture stems from the fact that networks must not only support UC (unicast) traffic (one source to one destination) but also MC (multicast) traffic that is, traffic in which a source may have to dispatch a same incoming flow of packets to more than one destination. Video distribution and network management traffic are of this latter case (e.g., the IP suite of protocols assumes that some control packets must be broadcast). To allow a straightforward re-sequencing in each egress adapter, the simplest solution is to perform, in each ingress adapter, a numbering of the packets on the basis of their destination and priority. In which case, each egress adapter needs only to restore a continuous e.g., ascending, sequence of numbers i.e.: n, n+1, n+2, etc. from each source and for each priority. This is easily feasible for unicast traffic where there is only one destination per incoming packet i.e., one egress adapter, for each packet entering a switch. For example, if one considers a 64-port switch handling 8 priorities there are only 64 sources times 8 priorities=512 flows thus, 512 independent sequences of numbers to handle by each egress adapter, since the invention also assumes that ingress adapters need not to be synchronized.

However, in this example of a 64-port switch, there are $2^{64}$-65 different combinations, times the number of priorities, of possible multicast flows from a same source. Even though not all may exist simultaneously it remains that each flow would have to be numbered separately, in sources, to keep coherency in the packet numbers received by the egress adapters. However, $2^{64}$ is an impossible number to deal with as far as the implementation of the corresponding resources is concerned. Therefore, the numbering of packets on a per flow basis, is not of an easy implementation due to the huge number of possible flows of data packets to handle.

Thus there is a need for a simple mechanism in egress adapters to re-order sequences of data packets, numbered on a per flow basis in the ingress adapters, which avoids the drawback of a complex implementation.

SUMMARY OF THE INVENTION

It is therefore an object of the invention to provide a system and method to restore sequences of data packets in the egress adapters of a parallel packet switch architecture.

It is another object of the invention to support resequencing of unicast as well as multicast traffic with a unique mechanism having a common set of resources.

It is yet another object of the invention to provide a system and method that dynamically manage the resources allocated to the traffic of data packets.

In an embodiment, the system operates in a parallel packet switch architecture having a plurality of switching planes coupled between a plurality of source ingress adapters and a plurality of egress adapters. Each source ingress adapter is arranged to output to the plurality of switching planes a plurality of numbered data packets, each numbered data packet belongs to one flow among a plurality of flows of sequentially numbered data packets. All data packets of a same flow have a same priority level and a same routing index to indicate the at least one egress adapter as the destination, and further have a source identifier to identify the source ingress adapter it is issued from. Each numbered data packet is switched through one switching plane among the plurality of switching planes and is delivered to the indicated at least one destination egress adapter. The system for resequencing per flow the data packets received by the at least one destination egress adapter comprises means for allocating to each received data packet a temporary storage location in a packet buffer. Pointing means allows pointing to an output register that has been previously assigned to the flow corresponding to each received data packet, by using the priority level, the routing index and the source identifier of each received data packet as flow identifiers. And determination means coupled to the allocation means and to the pointing means to determine if each received data packet is the next in sequence of its corresponding flow, by comparing the packet sequence number of each received data packet to the last packet sequence number used by each pointing output register.

The resequencing system operates for each received data packet according to the resequencing method described herein. And preferably, at each received data packet, a temporary storage location is allocated in a packet buffer to each received data packet. A Cross Reference Index associated to each flow of data packet is searched by extracting the priority level, the routing index and the source identifier of each received data packet. Each Cross Reference Index found is used to point to a respective output register previously assigned to the corresponding flow of each received data packet. And finally, the packet sequence number of each received data packet is compared to a packet sequence number stored in the respective pointed output register to determine if each received data packet is the next of its sequence or not.

Further objects, features and advantages of the present invention will become apparent to the ones skilled in the art upon examination of the following description in reference to the accompanying drawings. It is intended that any additional advantages be incorporated herein.

DETAILED DESCRIPTION OF THE PREFERRED EMBODIMENT

Figure 1:
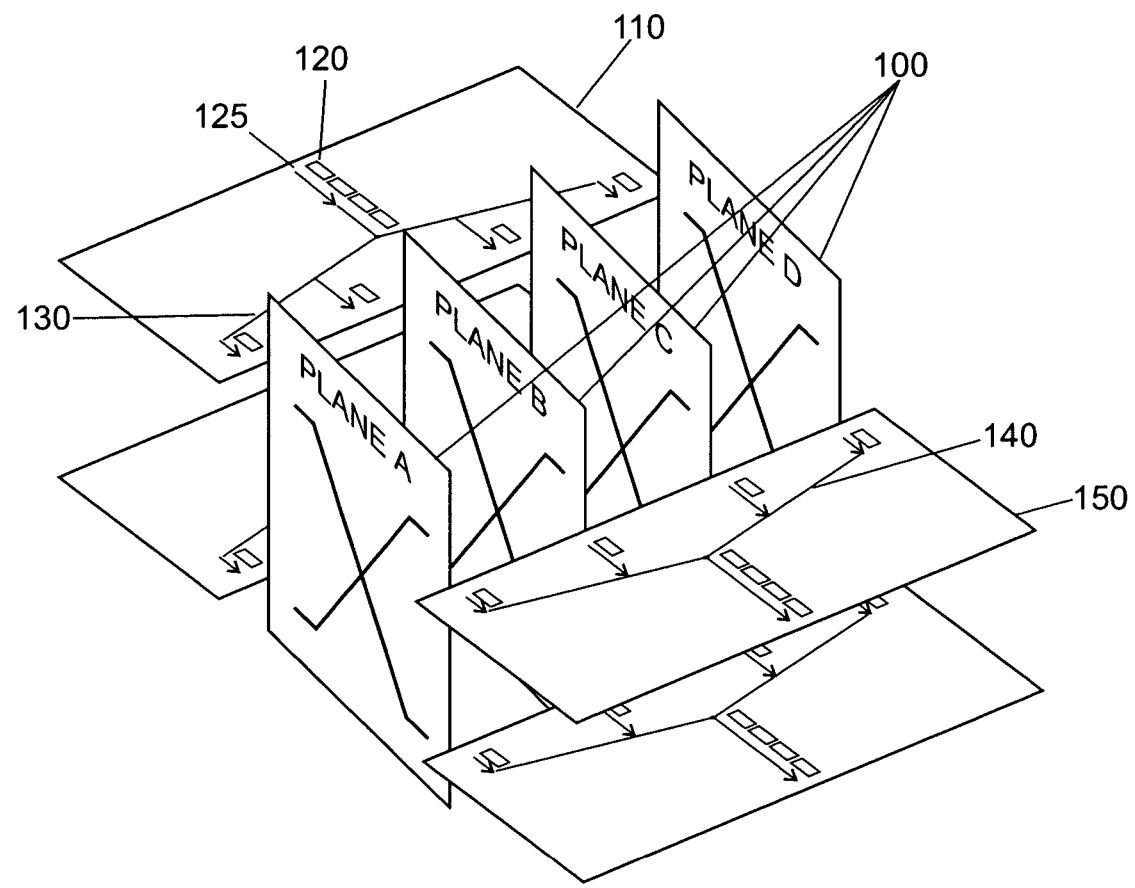
FIG. 1 shows a conceptual view of a parallel packet switch system to implement the invention.
Figure 2:
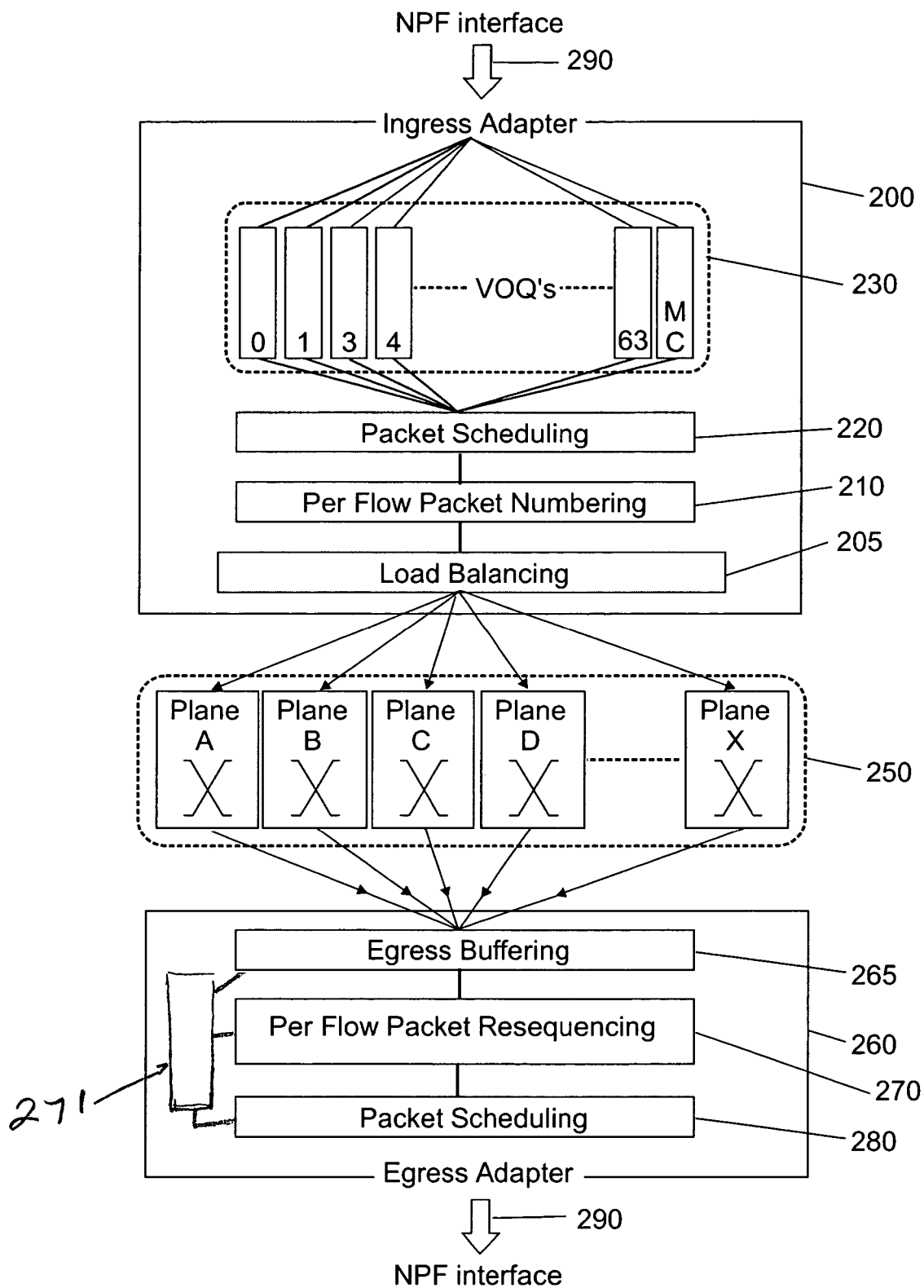
FIG. 2 is a functional block diagram of the invention.

FIG. 2 shows a functional view of a preferred PPS architecture according to teachings of the invention. For sake of clarity, only one ingress adapter (200) is shown interfacing a plurality of switching planes (planes A to X under block 250) over which an incoming traffic (290) of data packets is load balanced by a load balancer circuit (205). The skilled man will easily understand through the reading of the entire description that all functional principles described for one ingress adapter may be generalized to a plurality of ingress adapters.

To allow the re-sequencing of data packets in the egress adapters (260), prior to or while load-balancing, all packets are numbered per flow i.e., according to their priority and either their unique destination (for the unicast traffic) or according to the combinations of destinations (for the multicast traffic) implying there is one independent packet count per flow from any source or ingress adapter.

As discussed in the background section, there is possibly a huge number of such flows to handle in a switch because of the large number of possible combinations of multicast trees from an ingress port towards the output ports of the egress adapters. The present invention allows processing of such flows through a single mechanism so as to support not only unicast and multicast traffic but also the hot removal and insertion of a switching plane in order to provide for redundancy. It must also be noticed that the single mechanism further described in following figures does not require any form of synchronization between the ingress adapters so packets can be independently numbered in each ingress adapter.

Then, packets received through the various planes (250) are temporarily stored in an egress buffer (265). As mentioned earlier, reading out the packets from the switch planes must be done without delay since planes are assumed to process packets on a per priority basis too and, in no case, a packet of lower priority should stay on the way of a higher priority packet since this would create a priority HoL (head of line) blocking. As already stated above, the invention assumes that the packets are numbered independently according to the flows they belong to, in each source, packet re-sequencing (270) must also take into account the sources of the flows. Hence, the number of flows seen by an egress adapter is also multiplied by the number of possible sources while the number of flows issued from a source depends on the number of priorities and number of possible combinations of destinations of a packet. This latter number is directly dependent on the number of ports and by all means a large, and even a huge number, as soon as switch is comprised of a few tenths of ports since the number of combinations of destinations (UC+MC) from a source is $2^N-1$ in a N-port switch.

The above mode of operation i.e., re-sequencing per flow assumes that each egress adapter is equipped with an output scheduler (280), role of which is to select, at each packet cycle, what is the next packet, temporarily stored in the egress buffer (265), due to leave the egress adapter. Egress packet scheduling is a mechanism that is beyond the scope of the invention and is not further discussed other than to mention that its role is normally to serve the waiting packets of highest priorities first while, for each priority, maintaining fairness between the sources of traffic that are independently re-sequenced.

There is also a similar packet scheduling function (220) in each ingress port-adapter which selects the waiting incoming packets to be switched. Generally, waiting packets are organized under the form of VOQ's (Virtual Output Queues) (230), a scheme well known from the art which prevents priority and port destination HoL blocking in the ingress adapters so that a waiting incoming packet can neither be blocked by a lower priority packet nor by a packet destined for a busy switch output-port. These are standard functions in switch port-adapters. Packet scheduling (220, 280) and VOQ's (230) are not part of the invention which does not require any specific behaving from these elements to operate as specified in the rest of the description.

FIG. 2 and following figures illustrate the invention assuming that the switch is a 64-port switch so VOQ's have 64 unicast (UC) destinations (0-63) per priority plus the multicast (MC) destination. For this latter case there is, per flow, only one packet sent to one of the switching planes (as chosen by the load balancing function) which must replicate it to the multiple destinations concerned by the multicast flow to which packet belongs.

It is to be appreciated that generally switch port-adapters have a standard line or NP (network processor) IN and OUT interface (290) e.g., such as the ones defined by the Network Processing Forum (NPF), 39355 California Street, Suite 307, Fremont, Calif. 94538.

Egress controller 271 provides functions necessary to carry out teachings of the invention set forth herein. The Egress controller could be a programmed computer, ASIC, PLA or other circuit arrangements. The controller could be any combination of recited entities. The program to control the programmable computer consists of computer readable code stored in a computer readable medium.

Figure 3:
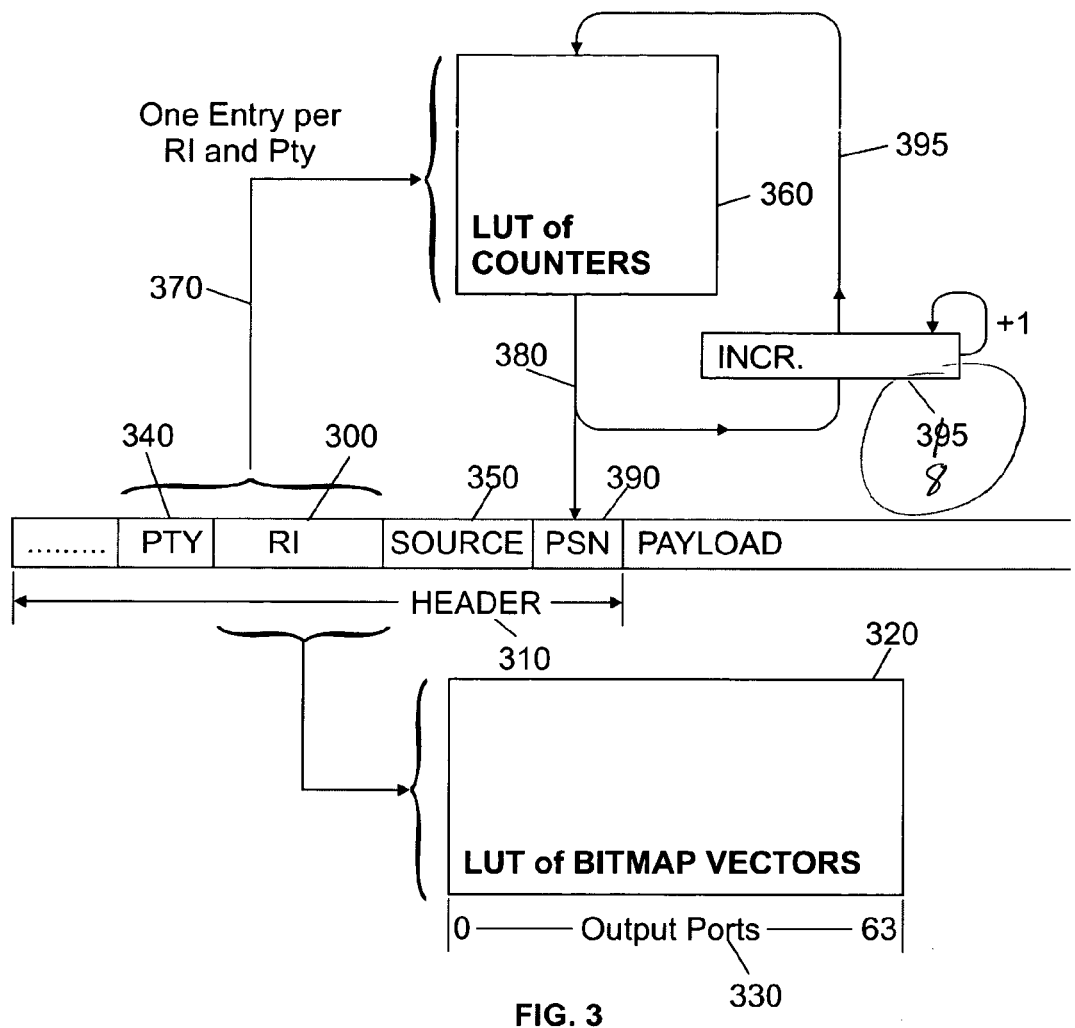
FIG. 3 is a block diagram of the components used to number the data packets on a per flow basis.

FIG. 3 depicts a preferred embodiment of the counters needed to number the packets on a per flow basis. The invention rests on the assumption that the switching function, at a node of a network, needs not to use all possible combinations of multicast trees permitted by the number of ports. In practice, if there is indeed a need to define several thousands of flows and, may be, tenths of thousands of flows, handling all $2^N-1$ possible combinations of a N-port switch is impractical and useless. Then, switches are often using what is referred to as a routing index (RI) limited, as an example, to a convenient 16-bit binary field (300) carried in the header (310) of each packet thus, representing $2^{16}-1$ or 65535 combinations. Each combination corresponds to a set of output ports through which a packet must be dispatched. If a fixed correspondence may implicitly exists between a RI and a combination of output ports there are however, generally, in the various components of the switch fabric a set of cross-reference tables or lookup tables (LUT) such as (320), initialized by the device in charge of managing the node. Device is thus free to establish any correspondence, better adapted for a particular application, between a RI (300) and a combination of output ports (330). For example, it may exist in each switching plane of a PPS structure, or in each ingress adapter, or in both, one or more such LUT's which, for each RI, returns a vector of bits often referred to as a bitmap (330) where ones correspond to the port(s) through which packet carrying that RI must exit switch fabric. Therefore, a packet can be routed in switch fabric according to its RI i.e., to one output port in case of UC traffic and to two or more ports if MC. When combined with priority (340) and source of a packet (350), RI may end up to define hundredths of thousands of flows in a switch fabric. Hence, the invention assumes that this mechanism is also used for the counters needed to allow re-sequencing in each egress adapter. Flow counter values are remembered in a LUT (360) so as with each packet leaving the ingress adapter LUT is interrogated at an entry corresponding to the packet RI and priority (370). The fetched current value (380) is immediately inserted in the packet serial number (PSN) field (390) of the packet header ready to be switched through one of the planes as selected by the load balancer (205) shown in FIG. 2. The current value is incremented (385) and stored back immediately (395) at the same address so as a next packet to go, for that RI and priority, can pick up immediately next PSN.

Figure 4:
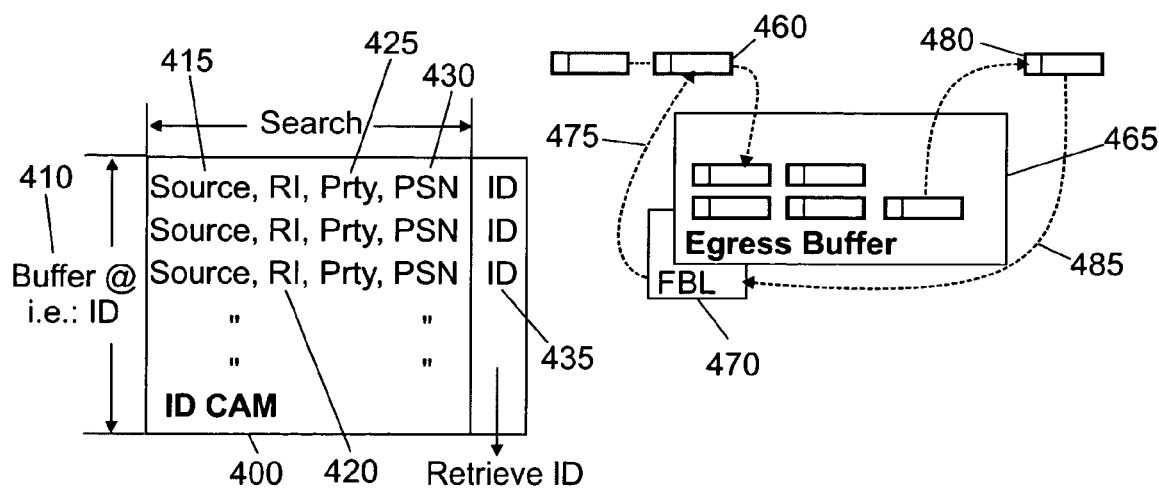
FIG. 4 details the data packet storing in the egress buffer and in the CAM elements.

FIG. 4 shows how the egress buffering function (265) of FIG. 2 is organized in an embodiment of the invention. Each incoming packet (460) switched through any of the PPS planes, is temporarily stored in an egress buffer (465) in an unconditional manner. The egress buffer is typically made of a RAM (Random Access Memory) either internal to an ASIC (Application Specific Integrated Circuit) used to implement the Ingress and Egress port-adapter functions or is using commercially available discrete RAM modules controlled by the ASIC. The invention assumes there is enough buffering provided to allow re-sequencing of all packet flows being handled in egress adapter at any moment. The upper value to consider is highly dependent on the operation of the switching planes used to implement the PPS structure. Especially, it depends on the number of priorities they are handling and of how much traffic they have to sustain under a worst case scenario of traffic corresponding to the application for which the switching function is devised. A typical parameter influencing the size of the buffer is the burstiness of the traffic i.e., the probability of having a series of N consecutive packets, at a same level of priority, all destined for the same port. This may be highly disturbing for the rest of the traffic creating contention and resulting in the holding of lower priority packets in some middle switching planes thus, preventing some flows from being re-sequenced while packets are already waiting in the egress buffer taking up space. The invention just assumes that buffer size has been dimensioned to allow re-sequencing under worst case conditions. In practice this is achieved by having a flow control implemented between the various components of the switching function i.e., the ingress and egress adapters and the individual switch planes.

Then, associated to the packet buffer (465) there is a list of free buffers or FBL (Free Buffer List) (470). With each incoming packet (460) a free buffer location is withdrawn (475) from FBL so that packet can immediately be stored. This is done irrespective of its priority, PSN, and plane through which it arrived in egress adapter.

In parallel, with each incoming packet an entry is made in a CAM (content addressable memory) (400) so as it is possible to later on retrieve where packets have been stored in egress buffer. Among many alternate methods the invention assumes that an entry is made into the CAM at an address corresponding to the egress buffer address chosen by FBL (470) to temporarily store the packet. Because packet locations are uniquely attributed by FBL there cannot be any conflict as a result of this operation. Thus, packet buffer address is a unique identifier or ID (410) while a packet is in egress buffer. What is stored in search field of CAM is then the source of the packet (415) i.e., the ingress adapter it came from, its routing index RI (420), its priority level (425) and its PSN (430). Hence, this field can be searched later on to retrieve a stored packet when the output scheduler (280) shown in FIG. 2, has performed a choice of which priority, source and RI must go. The result of this search is the ID or buffer address of a packet (435). Because, as mentioned above, each CAM entry is done at the buffer address selected by FBL there is no need in practice of storing the ID which corresponds to the address of the selected CAM row during the search operation. Hence, the retrieved ID is actually the decode of the CAM row selected by the search operation. ID CAM (400) has as many rows as there locations in the egress buffer.

Obviously each time a packet is forwarded (480) the corresponding buffer location is released (485) to FBL (470) which is free to reuse it immediately as well as the corresponding CAM entry.

Figure 5:
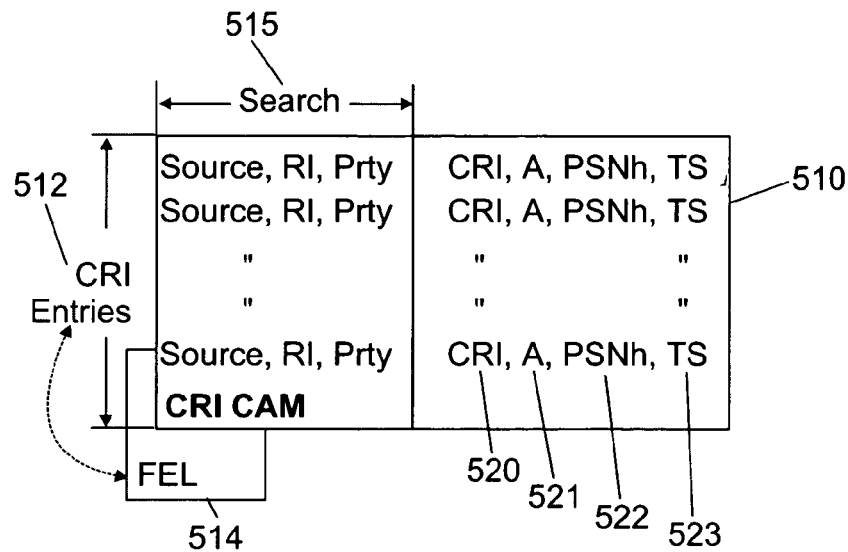
FIG. 5 is a block diagram of the components used to dynamically allocate resources to the flows of data packets.
Figure 5:
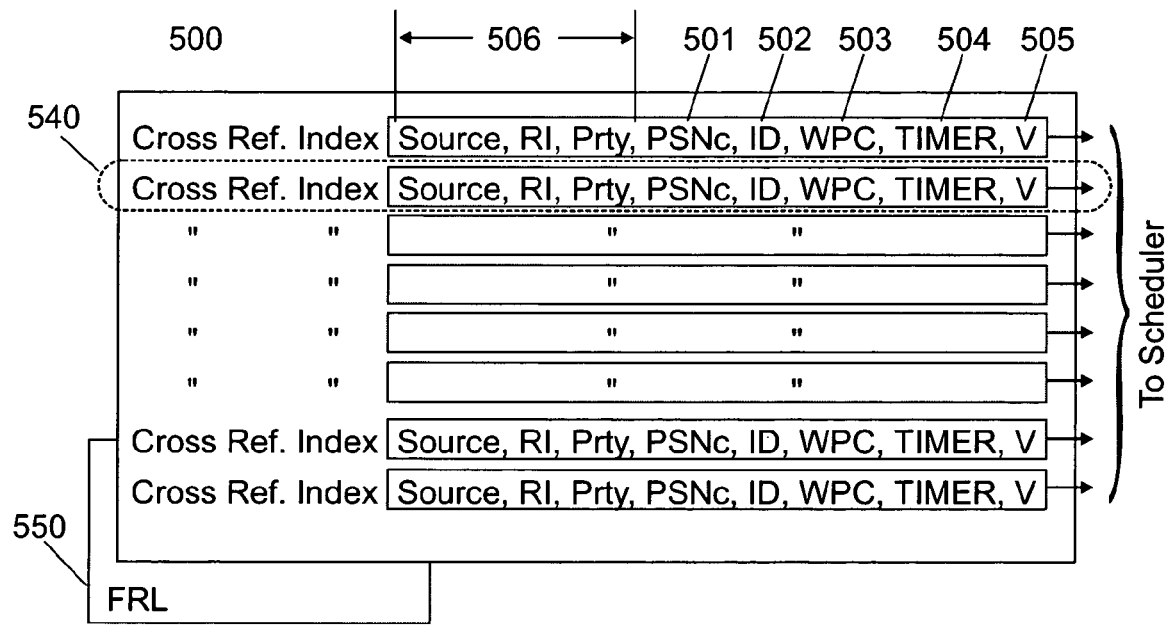

FIG. 5 further describes the pointers used in the egress adapter to dynamically manage the resources used to handle the flows of data packets arriving in each egress adapter.

Cost and level of integration of the ASIC's used to implement the switching functions, possibly including memories external to the ASIC's, are parameters that actually limit what can be stored in the egress buffer. Thus egress buffer is necessarily limited in size. An overall flow control must be exercised in the switch fabric so as buffer cannot overflow that would otherwise result in the discarding of packets. Hence, if a switch fabric may have to support tenths and even hundredths of thousands of flows it remains that, at any given instant, the number of active flows in egress adapter is bounded by the size of the egress buffer since, if each stored packet indeed belongs to a different flow, egress adapter cannot handled at any moment more flows than its maximum storing capacity.

Therefore, the invention assumes that an array of uncommitted output registers (500) are implemented to handle all the flows that can be supported simultaneously in the egress adapter. The number of those uncommitted output registers, which are attributed dynamically, must preferably match the number of locations of the egress buffer (465), and thus the number of entries in the ID CAM (400). The number of registers could possibly be lower however, it would be necessary to assume that flows of packets stored in buffer are, e.g., comprised of at least two packets each, to allow to divide by two, the number of registers versus the packet storing capacity of the buffer. Thus, to avoid such limitation, the invention preferably uses as many output registers as packet locations in the buffer so that all active flows can be single-packet flows, which is the worst case. As an example, being given the limitation of a state-of-the-art CMOS technology available to implement ASIC's, an ASIC imbedded buffer can reasonably contain up to 4 k packets while the number of flows to support in an egress adapter may have to be, as already discussed, at least one order of magnitude (×10) larger.

The dynamic allocation of the output registers thus requires that a Cross Reference Index (CRI) table held in an identifier field of a searchable device e.g., a content addressable memory (510), establishes a correspondence between a flow and the respective output register currently in use for this flow e.g., (540). Therefore, CRI CAM (510) has a search field (515) comprising the source of the packets, their RI's and priorities (together defining a flow). For each packet received from any switching plane, those parameters are extracted from the header and a search is performed in the CRI CAM output register currently in use by the corresponding flow.

If search of the CRI CAM does not match any entry, it means that the corresponding flow is not currently in the egress adapter thus, a new correspondence must be established. To this end, there is a free register list or FRL (550) from which a free set of output registers is withdrawn (if any left, this is further discussed in the following) and attributed to the new detected flow through an updating of the CRI CAM.

When a flow is no longer active corresponding output registers are permitted to be used by other flows thus, they are released to FRL. However, entry in the CRI CAM must not be removed in order to remember the highest PSN (packet serial number) received for all flows that once have been active (522). This is necessary so as to remember what was the latest packet number used i.e., the highest if assuming that an ascending sequence of numbers is used to number the packets, for the flows in corresponding ingress adapters even though it was a long time ago, and to be sure that a new received packet is in sequence or not. As a consequence CRI CAM (510), or any other kind of search device, must be large enough to remember a number of flows compatible with what must be supported in egress adapters. Again, tenths of thousands of flows may have to be supported. If because of ASIC limitations egress buffer cannot hold more than a few thousands packets, for example 4 k packets, a practical number for the flows must be at least 10 times higher typically, CRI CAM or search device should have 64 k entries (512) and equipped with a device in charge of managing the attribution and release of entries including a FEL (514) table (free entry list).

From the above discussion, it appears that CRI CAM also contains an activity identifier within the identifiers field, and when interrogated, returns not only a cross reference index but also an active bit A (521) along with the highest PSN i.e., PSNh (522) already mentioned above. Therefore, when the last packet of a flow, currently present in the egress buffer, is forwarded (as schedule by scheduler 280), the corresponding set of output registers are released to FRL (550), A bit of CRI CAM is reset (521) and last packet sequence number PSNh (522) set to the current PSN i.e., PSNc which is the highest re-sequenced by definition, since it is the last to leave the egress adapter. More details on the release of unused registers are later given with reference to FIG. 9.

PSNh and A bit are then further used when a flow resumes, with the arrival of a new packet in the egress adapter. In which case CRI CAM is interrogated. A match is found for the corresponding flow identifiers, but A bit is not asserted which means there is actually no output register active for that flow. A new correspondence is established, CRI field (520) is updated, A bit asserted and newly attributed output register (500) updated accordingly as further discussed here after.

As a result of the above operations, CRI CAM tends to fill up over time when new flows are received i.e., flows on which traffic has never been observed since switch was turned on. Hence, a grooming of CRI CAM may have to be performed to prevent overfilling in order e.g., to get rid of the oldest unused entries. To this end, there might have an optional time stamp field TS (523), updated each time corresponding entry is fetched so as CRI CAM can be scrubbed e.g., by a background task. This is further described in FIG. 8.

Content of output registers (500) includes a current PSN i.e., PSNc (501), holding the sequence number of the last forwarded packet if a valid bit V (505) is inactive, or the next to go if there is a request posted to the egress scheduler because valid bit V (505) is active. Other fields are the ID (502) or address of where the in-process packet is stored in the egress buffer and, optionally, a WPC (waiting packet counter 503) and a timer (504). Moreover, output registers hold (506) to what flow i.e., to what combination of source, RI and priority, they are temporarily affected.

How those hardware resources are used is detailed in the following figures.

Figure 6:
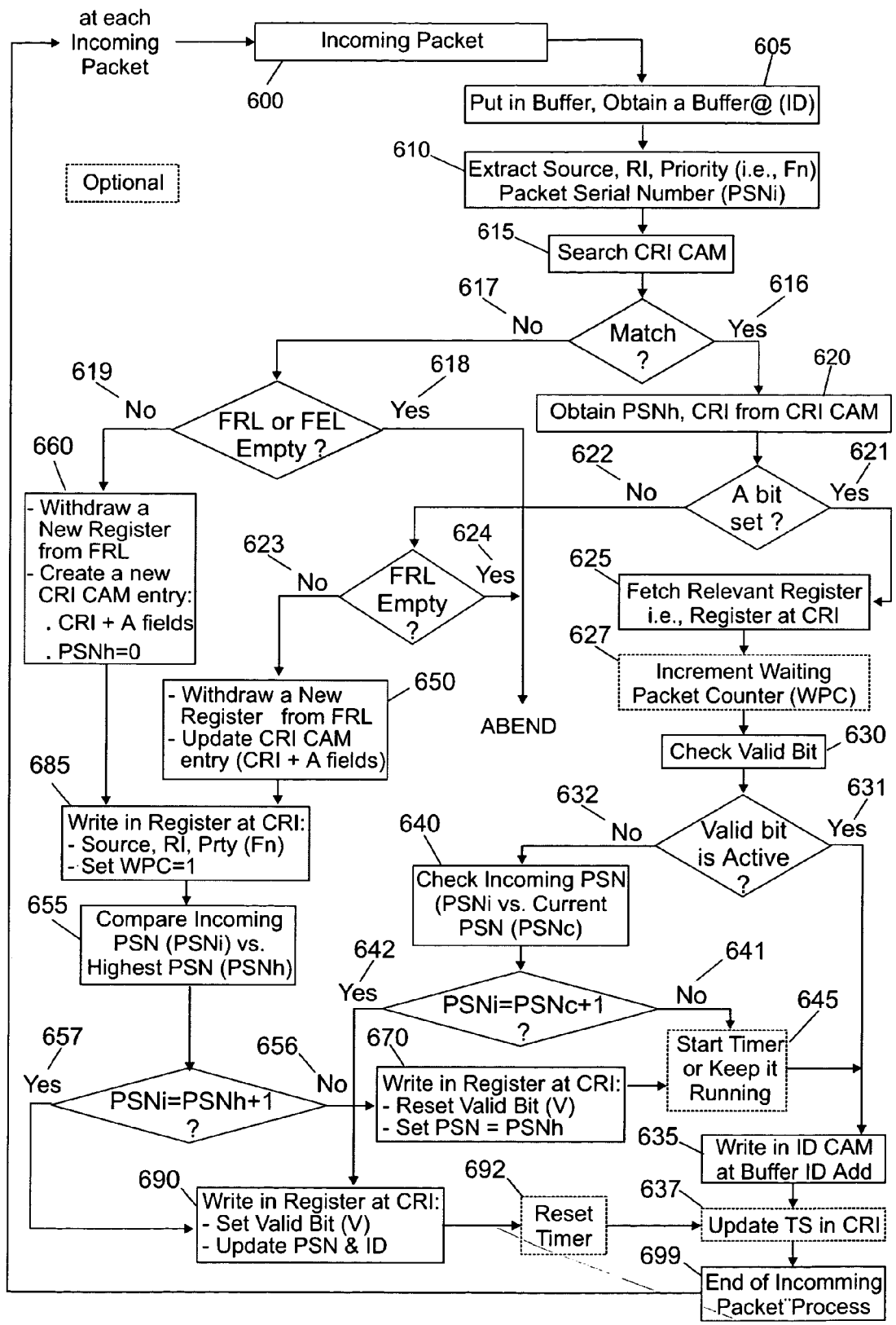
FIG. 6 is a flow chart of the incoming packet process in the egress adapter.

FIG. 6 describes the process of any packet received in the egress adapter through a PPS plane.

When a packet is read out (600) from one of the switching plane, from a given source at a given priority it is unconditionally stored in the egress buffer, shown in FIG. 4, after FBL has selected an address in buffer i.e., the packet ID (605). Prior or while storing packet, its source, RI, priority i.e., flow Fn to which packet belongs, and PSN (packet sequence number) are extracted (610). Those parameters are used to search CRI CAM shown in FIG. 5. If a match is found, CRI (cross reference index) and highest PSN i.e., PSNh are obtained from CRI CAM along with the active bit A which must be checked. If A is found active (621) a fetch of the register corresponding at CRI can be performed (625) so as to retrieve the current parameters of the flow. WPC, if used, must be incremented (627) and valid bit V checked (630). If V is found active (631), ID CAM of FIG. 4 is updated (635) in order to be able to later retrieve the just stored packet. Then, TS field of CRI CAM is updated (637), if used, which ends the incoming packet process (699).

However, if at step (630) valid bit V is not found active (632), PSNi is compared with current PSN found in register addressed by CRI i.e., PSNc (640). If PSNi is not strictly the next in sequence i.e., PSNc+1 (641), timer is started or kept running if already started (645), since an out of sequence packet is being received (this is an optional step). This ends the incoming packet process (699) after steps (635) and optionally step (637), already described, are executed.

If at step (640) PSNi is indeed strictly the next in sequence (642), register addressed by CRI is updated (690). That is, V is set so as to post a request to the egress scheduler. PSN is incremented and ID of incoming packet replaces the previous one. Since the next in sequence packet has been received, timer, if any is used, is reset (692) which ends the incoming packet process (699), optionally, after the execution of step (637).

If at step (620) active bit A is however not asserted (622), because there is no register active for the flow to which packet belongs, a new register is attributed from FRL (650). This is only possible if FRL is not empty (623). If FRL is empty (624), process abends and an error may be reported. As discussed with FIG. 5, to prevent this from ever happening, a background task may be run that cleans up CRI CAM of unused entries. This is further discussed in FIG. 8. Then, at step (650) CRI CAM entry is updated. The new cross reference index, as given by FRL, replaces the previous one and active bit A is asserted. In newly attributed register, WPC is set to 1 and the parameters of the flow are updated i.e., the source, RI and priority (685). Then, PSN of incoming packet i.e., PSNi, is compared (655) to PSN of the last forwarded packet for that flow i.e., PSNh read from CRI CAM at step (620) or set at step (660) later described. If strictly in sequence (657) then, one proceeds with the steps (690), (692), (637) and (699), already described above, which ends the incoming packet process.

If at step (655) comparison shows that received packet is not strictly in sequence (656) then, output register is updated (670) in resetting valid bit (this is a confirmation that no request is posted to the egress scheduler for this packet flow) and PSN replaced by PSNh found in CRI CAM at step (620) or set at step (660) since the new packet is found to be out of sequence.

If at step (615) the search of CRI CAM does not give any match (617) it is the indication that the just received packet belongs to a flow that has never been used since power-on, or belongs to a flow that has been deleted from CRI CAM by the device in charge of managing the switch (so as, e.g., to prevent CRI CAM from overflowing). Then, as at step (650) above, a new output register is attributed and a CRI CAM entry created which assumes that a new entry is withdrawn from the FEL shown in FIG. 5 (660). This is only possible if FRL and FEL are both not empty (619). If either one is empty (618), process abends and an error may be reported. Also PSNh is forced so that a valid comparison at step (655) can be performed. This implicitly assumes that, when a flow is started, or restarted after it was deleted from CRI CAM, the device in charge of managing the node must concurrently set the corresponding source counter (the one at the origin of the flow) shown in FIG. 3, to a predetermined value. Because flow was deleted from CRI CAM, egress adapter has no memory of where count stopped. As an example, if all counters are devised to start counting to 1 then, PSNh should be set to 0 so that the first packet is indeed found in sequence. This ends the incoming packet process after all steps from (655), already described above, are executed.

Figure 7:
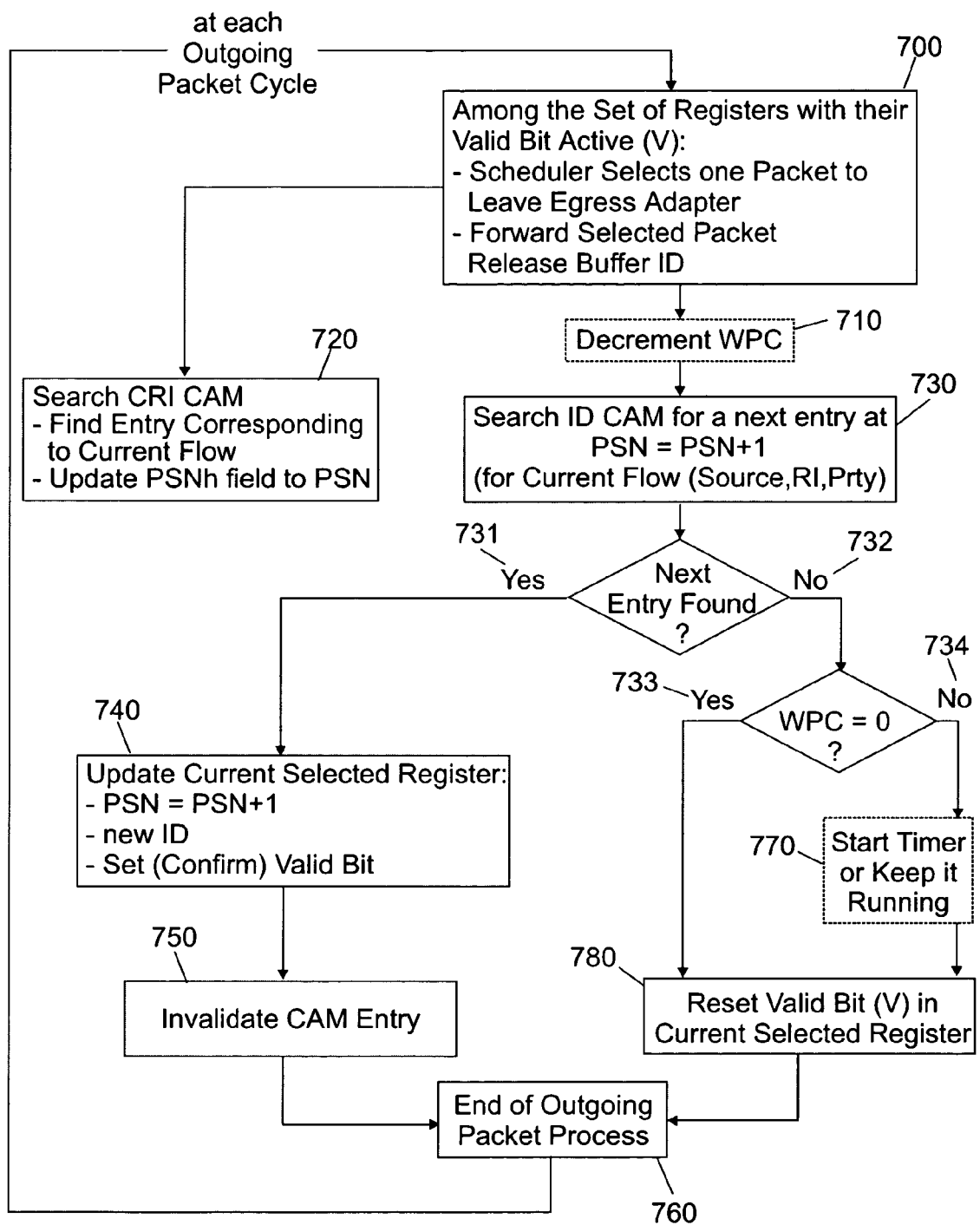
FIG. 7 is a flow chart of the outgoing packet process in the egress adapter.

FIG. 7 describes the process of an outgoing packet. Among the set of uncommitted output registers having their valid bit active, scheduler selects one flow having a packet ready to go (called a in-process packet).

The algorithm on which scheduler chooses a next packet to go is beyond the scope of the invention which does not assume any particular method of selection. In general, the waiting packets of the highest priority have precedence however, at a same level of priority, fairness must be exercised between all sources and flows. Exceptions may have to be considered to the strict priority rule if, e.g., one wants to guarantee a minimum bandwidth to lower priority traffic. All of this is highly dependent on the architectural choices that are made to fulfill the requirements of a particular application.

Once a choice is made, selected packet is forwarded so as corresponding buffer can be released to FBL (step 700). If there is a waiting packet counter, this is optional, WPC is decremented (step 710). Then, CAM's are searched. This can be done independently in parallel, as shown, or sequentially.

On the one hand, CRI CAM has its PSN field, i.e., PSHh, updated (step 720) so that this field always reflects the PSN of the last gone packet thus, carrying the highest PSN in sequence since, in the example used to illustrate the invention, packets are assumed to be numbered per flow through an ascending complete sequence n, n+1, n+2, etc. Other schemes are obviously possible, like using a decreasing sequence of numbers in which case the last packet gone would obviously carries the lowest number. Updating PSN field of CRI CAM is necessary in case the uncommitted output register currently in use for the flow e.g., register (540) as shown on FIG. 5, would be released to FRL after a pause of traffic. Hence, the last forwarded PSN must be remembered when traffic resumes for this flow as it is shown in FIG. 6 at step (655).

On the other hand, ID CAM is searched (step 730) in an attempt to find a next packet in sequence. If found (branch 731), current output register is updated. PSN is incremented and ID replaced by the address in buffer of the just found next-to-go packet while valid bit is kept asserted (step 740). Then, ID CAM entry is invalidated (step 750) to prevent any further match. How this is done is highly dependent of the CAM characteristics in use. A straightforward technique, always possible, consists in resetting the search field to a value which is never normally used so as no match may possibly occurrences. This ends the processing of an outgoing packet (step 760).

If at step 730 no match is however found in ID CAM (branch 732) the next packet in sequence is not yet available, in which case a timer is started (step 770) if WPC is different from zero (branch 734) or there is no other waiting packet if WPC is indeed zero (branch 733). Thus, packet just forwarded was the last in egress buffer. In both cases, valid bit V is reset (step 780) so as no further request is posted to egress scheduler which ends the processing of an outgoing packet (step 760). Again, the use of WPC and of a timer is optional.

Figure 8:
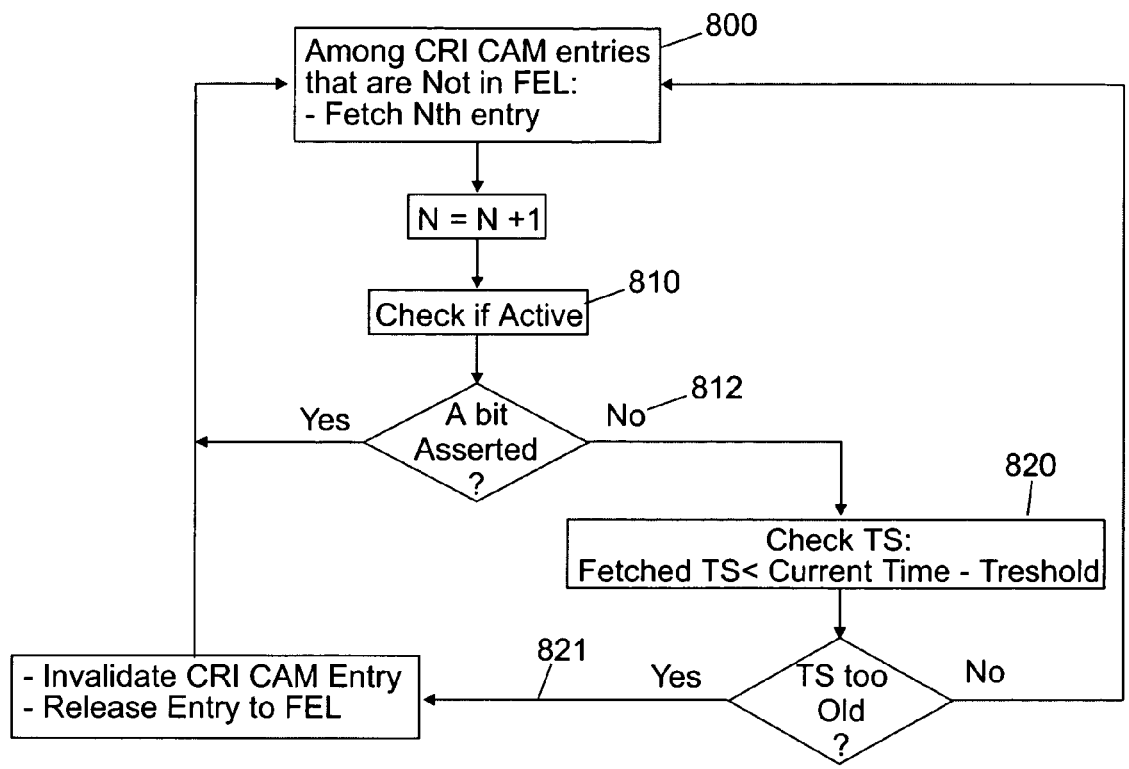
FIG. 8 illustrates the scrubbing routine to prevent over filling of the CRI CAM.

FIG. 8 discusses the filling of CRI CAM resulting of the addition of flows in a switching node using the invention. As a reminder, a flow as seen by an egress adapter, is at least comprised of one packet received from a given source (i.e., an ingress adapter) with a given routing index or RI, at a given priority. There are, potentially, a huge number of such flows. Using the same previous example of a 64-port switch, handling traffic on 8 priorities and supporting a 16-bit RI field thus, $2^{16}$ or 64 k combinations of MC and UC destinations, this gives 32 millions ($32 \times 10^6$) of possible flows in each egress adapter.

First, depending on the application, nothing specific may have to be done. CRI CAM may not overflow just because the device in charge of managing the switching node never actually creates more flows than CRI CAM can hold. In such a type of applications there are a rather small finite number of flows especially, few MC flows, that are created, once for all, while switch is up and running.

In a second type of applications of the invention more flows than what can be stored in CRI CAM may have to be used over time. That is, while switching device stays up and running some flows, that were active, are no longer used and replaced by new ones as traffic handled by network evolves. The traffic manager in charge of the switching node may have the capability of accessing, through the proper equipment e.g., a node or switch controller, egress port CRI CAM's so as to trigger the deletion of the obsolete flows to prevent CRI CAM from ever overflowing. It is worth noting here that the same thing must be done for the LUT of bitmap vectors shown in FIG. 3. When RI's are changed this must be reflected in those tables through a similar mechanism.

If such a mechanism is not available, or used, a third approach to the grooming of CRI CAM can be performed. Then, according to a preferred embodiment of the invention, there is a scrubbing routine (FIG. 8) which, as a background task, continuously goes through all CRI CAM entries (800) that are in use (those NOT in FEL). Time stamp and active A bit fields shown in FIG. 5 are checked (810, 820). Thus, among the non-active flows (812), those having a time stamp older than a predetermined value (821) can be withdrawn hence, automatically preventing CRI CAM from over filling.

It should be clear, however, that dimensioning CRI CAM for a given application requires the CRI CAM to be large enough to support all flows that need to be active together while the switch is up and running.

Figure 9:
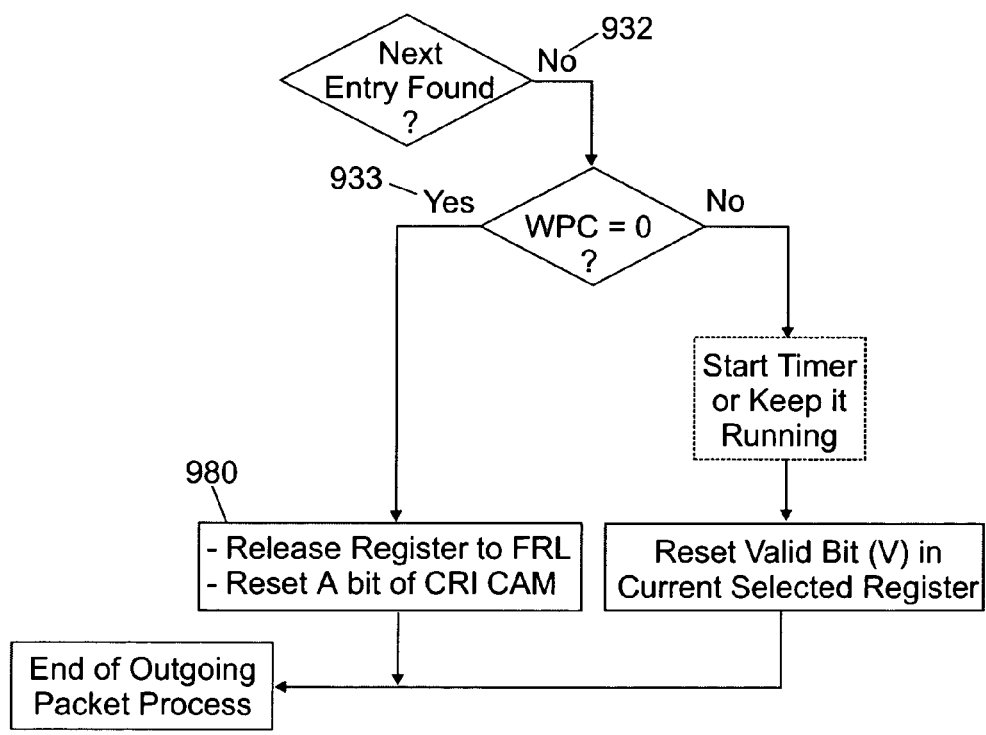
FIG. 9 illustrates the optional release routine to release unused output registers

FIG. 9 describes the release of the uncommitted output registers of FIG. 5 when no longer in use.

First, like with CRI CAM above, depending on the applications, nothing specific may have to be done. There may be applications where there are fewer flows used than the number of available uncommitted registers. In which case there is no real need to release any buffer.

However, in the general case there will be fewer registers than the number of flows to be supported. As a consequence, in a preferred embodiment of the invention, registers must be released to FRL when there is no packet left in egress buffer for a flow. To this end, state diagram of FIG. 7, that describes the process of forwarding a packet, must be modified as shown in FIG. 9. When a next entry is not found (932) one must check if there is any packet left in egress buffer. If none are left (933) then, register can be released to FRL and active A bit of CRI CAM reset (980). Hence, in this case, WPC is a mandatory feature and corresponding steps are no longer optional. The rest of the forwarding algorithm is not otherwise modified.

Figure 10:
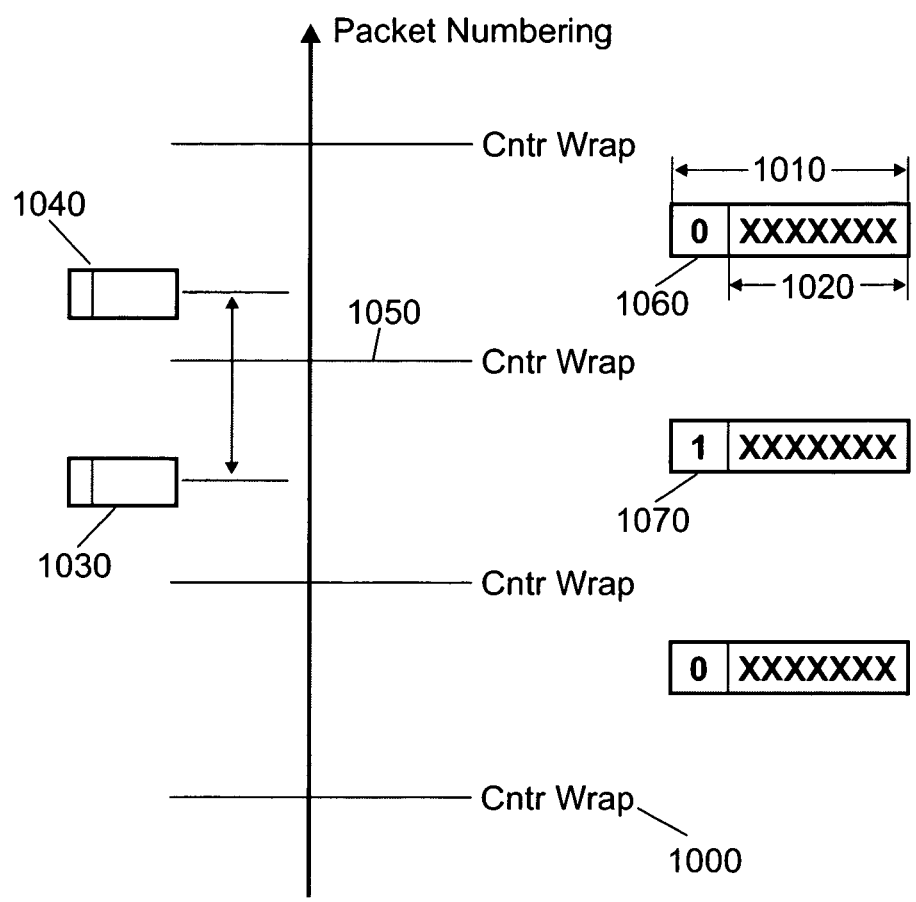
FIG. 10 is a schematic view to illustrate the wrapping of the source counters.

FIG. 10 briefly discusses the problem of the wrapping (1000) of the source counters used to number the packets. Those counters have a finite length thus, whichever their counting capacity the problem of their wrapping must be solved. The invention assumes that those counters, implementation of which is shown in FIG. 3, have one bit more (1060,1070) than what is necessary to number the packets. For a given application the counting capacity (1020) must be determined so that the oldest numbered packet still waiting in the egress buffer (1030) cannot be wrongly compared with a new arriving packet pertaining to the same flow because the counter used in the source has wrapped in the mean time. Once this value has been determined the invention assumes that the counters are all made one bit wider so that numbering of waiting packets cannot span on more than one counter wrapping boundary (1050). Then, it is easy to take care of the counter wrapping. One solution detects the first occurrence of a readout packet number for which MSB (most significant bit) is found to be 0 (1060) after a series of ones. In which case the egress resources must immediately start to use PSN fields in toggling the value of the MSB bit.

It must be clear to those skilled in the art that the re-sequencing according to the invention as described here above in FIGS. 2 to 10 does not require any dedicated resources to implement a transparent switch over in case of failure of a switching plane. Indeed, ingress adapters (load balancing function) may be instructed to skip a plane any time in view of its replacement or, for any other reason, while all egress adapters keep re-sequencing transparently since the scheme according to the invention neither require that all planes be active nor make an assumption on the way traffic is load balance by the ingress adapters thus, meeting the objective of having a free transparent switch-over mechanism as a result of the use of the invention.

Also, because re-sequencing is done on a per flow basis, unicast and multicast traffic can indeed be handled transparently in egress adapters by the exact same mechanism of the invention.

While the invention has been particularly shown and described with references to an embodiment, it will be understood by those skilled in the art that various changes in both form and detail may be made therein without departing from the scope and spirit of the invention.

Having thus described our invention, what we claim is as follows:

1. A system for resequencing per flow data packets received by at least one destination egress adapter comprising:
   a plurality of output registers with each register dynamically assigned to store received data packets from one of a plurality of flows, wherein each of the output registers further comprises:
   a packet sequence number and a packet buffer identifier for an in-process data packet; and
   a valid-bit latch to set an active/not active status that indicates if the in-process data packet is already output;
   means for allocating a temporary storage location in a packet buffer to each received data packet;
   means using predefined parameters, for pointing to an output register previously assigned to receive data packets from a corresponding flow; and
   means coupled to the allocating means and to the pointing means for determining if each received data packet is the next in sequence of the corresponding flow, by comparing the packet sequence number (PSN) of said each received data packet to the last packet sequence number (PSNc,PSNh) used by the pointed output register and scheduling means coupled to the determination means for selecting one of the in-process data packets to be output, wherein the scheduling means is coupled to each of the valid-bit latches to select one valid-bit latch having an active status.

2. The system of claim 1 wherein the means for pointing to an output register comprise a first Content Addressable Memory wherein each entry includes a search field having a source identifier, a routing index and a priority level, and an associated identifier field including a Cross Reference Index to point to a previously assigned output register among the plurality of output registers.

3. The system of claim 2 wherein the identifier field further contains an activity identifier to indicate when a previously assigned output register is no longer active, and a packet sequence number equal to the last packet sequence number received for the corresponding flow.

4. The system of claim 2 wherein the means for pointing further comprise means for providing a new output register to each new flow of data packets.

5. The system of claim 2 wherein the first Content Addressable Memory further comprises means for preventing over filling of said first Content Addressable Memory.

6. The system of claim 2 further comprising a second Content Addressable Memory wherein each entry including a source identifier a routing index a priority level and the packet sequence number of each stored data packet, and an associated identifier field to give a packet buffer identifier (ID) that identifies the storage location allocated to each received data packet.

7. The system of claim 1 wherein each of the output registers further comprises a counter to maintain a value for, each flow, the number of data packets stored in the packet buffer waiting to be transmitted.

8. The system of claim 1 wherein the means for allocating comprise a free buffer list to allocate a free temporary storage location (ID) to each received data packet.

9. The system of claim 1 wherein the data packets comprise unicast and multicast data packets.

10. The system of claim 1 further including at least one ingress adapter comprising counting means for sequentially numbering data packets of a same flow.

11. The system of claim 10 wherein the ingress adapter further comprises means for load balancing the data packets over a plurality of independent switching planes.

12. The system of claim 1 wherein the predefined parameters include Priority Level (PTY), Routing Index (RI) and Source Identifier.

* * * * *